United States Patent [19]

Nakhamkin

[11] Patent Number: 4,765,142
[45] Date of Patent: Aug. 23, 1988

[54] COMPRESSED AIR ENERGY STORAGE TURBOMACHINERY CYCLE WITH COMPRESSION HEAT RECOVERY, STORAGE, STEAM GENERATION AND UTILIZATION DURING POWER GENERATION

[75] Inventor: Michael Nakhamkin, Fanwood, N.J.

[73] Assignee: Gibbs & Hill, Inc., New York, N.Y.

[21] Appl. No.: 48,852

[22] Filed: May 12, 1987

[51] Int. Cl.⁴ ............................ F01K 3/02; F02C 3/12
[52] U.S. Cl. ........................................ 60/652; 60/659; 60/727
[58] Field of Search ............................ 60/727, 652, 659

[56] References Cited

U.S. PATENT DOCUMENTS

| | | | |
|---|---|---|---|
| 3,988,897 | 11/1976 | Strub | 60/659 X |
| 4,150,547 | 4/1977 | Hobson | 60/652 X |
| 4,275,310 | 6/1981 | Summers et al. | 60/659 X |

Primary Examiner—Allen M. Ostrager
Attorney, Agent, or Firm—Pennie & Edmonds

[57] ABSTRACT

A thermal energy peaking/intermediate power plant is disclosed having a compression mode in which thermal energy is produced and stored in a thermal energy storage device and an expansion mode in which such stored thermal energy is utilized to produce steam from water and inject such steam into a combustion process.

17 Claims, 1 Drawing Sheet

COMPRESSED AIR ENERGY STORAGE TURBOMACHINERY CYCLE WITH COMPRESSION HEAT RECOVERY, STORAGE, STEAM GENERATION AND UTILIZATION DURING POWER GENERATION

CROSS-REFERENCE TO RELATED APPLICATIONS

Related U.S. patent applications are "Retrofit of Simple Cycle Gas Turbines For Compressed Air Energy Storage Application" (Ser. No. 049,650), "Compressed Air Turbomachinery Cycle with Reheat and High Pressure Air Preheating in Recuperator" (Ser. No. 049,870), "Utilization of Circulating Fluidized Bed Combustors for Compressed Air Energy Storage Application" (Ser. No. 049,649), and "Advanced Recuperator" (Ser. No. 048,849), all of which are filed concurrently and are incorporated herein by reference.

BACKGROUND OF THE INVENTION

This invention relates generally to the storage and subsequent recovery of thermal energy and more specifically to the storage of thermal energy produced during a compression mode in a Compressed Air Energy Storage (CAES) system and subsequent recovery of such heat energy in an expansion, or power generation mode.

CAES power plants have become effective contributors to a utility's generation mix as a source of peaking or intermediate energy and spinning reserve. CAES plants store off-peak energy from relatively inexpensive energy sources such as coal and nuclear baseload plants by compressing air into storage devices such as underground caverns or reservoirs. Such underground storage can be developed in hard rock, bedded salt, salt dome or aquifer media.

Following off-peak storage, the air is withdrawn from storage, heated, combined with fuel and expanded through expanders, i.e., turbines, to provide needed peaking/intermediate power. Since inexpensive off-peak energy is used compress the air, the need for premium fuels, such as natural gas and imported oil, is reduced by as much as two thirds compared with conventional gas turbines.

Compressors and turbines in CAES plants are each connected to a generator/motor device through respective clutches, permitting operation either solely of the compressors or solely of the turbines during appropriate selected time periods. During off-peak periods (i.e., nights and weekends), the compressor train is driven through its clutch by the generator/motor. In this scheme, the generator/motor functions as a motor, drawing power from a power grid. The compressed air is then cooled and delivered to underground storage.

During peak or intermediate periods, with the turbine clutch engaged, air is withdrawn from storage and then heated and expanded through a turbine train to provide power by driving the generator/motor. In this scheme, the generator/motor functions as a generator, providing power to a power grid. To improve the CAES heat rate, waste heat from a low pressure turbine exhaust is used to preheat high pressure turbine inlet air in a recuperator.

For a more complete discussion of CAES systems, see Nakhamkin, M. et. al. "Compressed Air Energy Storage: Plant Integration, Turbomachinery Development", ASME International Gas Turbine Symposium and Exhibition, Beijing, Peoples' Republic of China, 1985 and Nakhamkin, M. et. al. "Compressed Air Energy Storage (CAES): Overview, Performance and Cost Data for 25MW to 220MW Plants", Joint Power Generation Conference, Toronto, Canada, 1984, both incorporated herein by reference.

The compression process of the CAES plant is characterized by a much higher overall compression ratio than that for conventional gas turbines. This requires multistage compression with intercoolers in order to improve CAES plant efficiency.

It has been recognized that heat rejected in intercoolers utilized to cool compressed air during the compression process typically represents over ninety percent of the overall energy consumed and conventionally wasted. It is therefore desirable to utilize this conventionally wasted heat in order to improve the overall efficiency of the power plant.

Although devices such as that disclosed in U.S. Pat. No. 4,100,745 which store heat produced by a baseload power plant for subsequent use in a peaking/intermediate power plant are known, it is believed that no adequate system exists as a part of the CAES plant cycle for storing heat produced by a peaking/intermediate plant during its compression mode for subsequent use in the same plant during its expansion mode.

An additional deficiency of known systems which require combustion of fossil fuels is the production of nitrogen monoxide (NO) and nitrogen dioxide ($NO_2$), collectively referred to as $NO_x$ which is a by-product of the combustion of virtually all fossil fuels. In the past, the quantities of such oxides of nitrogen were believed to be insufficient to adversely affect the environment. However, present concern with the efficiency of the combustion process coupled with a realization that such oxides of nitrogen are key constituents in a complex photochemical oxidant reaction with sunlight which produces smog have culminated in extensive regulations by both state and federal authorities.

Present use of $NO_x$ formation inhibition devices and techniques as well as removal equipment requires the use of specialized dedicated equipment, resulting in increased consumer power costs.

SUMMARY OF THE INVENTION

The present invention comprises a CAES cycle which utilizes thermal energy storage as a method and apparatus for storing heat produced by a peaking/intermediate plant during a compression mode for subsequent use for generation of steam and its injection into a combustor during an expansion mode.

In the presently preferred embodiment, heat produced by a compressor(s) during the compression mode is removed from the compressor(s) and/or intercooler(s) and stored in a thermal energy storage (TES) device. During power generation, i.e., expansion, heat stored in the TES device is utilized for heating water to produce saturated steam. The saturated steam is subsequently injected into and mixed with compressed air from a compressed air storage device at a point prior to entering a high pressure combustor. Advantageously, the compressed air has been preheated by a recuperator recovering the low pressure turbine exhaust gas heat. The air/steam mixture is then superheated by the use of a fuel and expanded in a high pressure turbine. The exhaust gas of the high pressure turbine is reheated in a low pressure combustor by the use of a fuel and subsequently expanded in the low pressure turbine.

Through the incorporation of TES in the CAES plant cycle, the compression heat otherwise wasted is now recovered and utilized for steam generation that is injected into the compressed air flow at a point prior to entering the high pressure combustor resulting in the following:

increased power output by as much as seventeen percent;

significant increase in overall CAES plant efficiency, and a corresponding decrease in specific fuel consumption, Lbs./kWh; and savings in underground storage costs.

For example, through the addition of, illustratively, 12 lbs. of steam to 200 lbs. of compressed air, an increase in power output of seventeen percent is achieved.

Furthermore, the injection of steam into a combustor as taught by the present invention resolves the $NO_x$ emission problem associated with practically all fossil fuel burning plants. As a result, no additional dedicated $NO_x$ prevention and/or removal devices are generally required to comply with state and federal $NO_x$ emission regulations.

Accordingly, it is a primary object of the present invention to provide a new and more efficient CAES cycle with TES for steam generation and injection into a high pressure combustor.

A further object of the present invention is to provide, with the same turbomachinery train, additional power output during an expansion mode of a CAES system operation without a corresponding additional power input in a compression mode during off-peak operation.

Another object of the present invention is to provide a newly designed TES system which stores thermal energy produced during a compression mode of operation for subsequent saturated steam generation and use during an expansion mode of operation.

BRIEF DESCRIPTION OF THE DRAWINGS

These and other objects, features and advantages of the invention will become more readily apparent with reference to the following description of the invention in which.

DETAILED DESCRIPTION OF THE INVENTION

Figure 1:
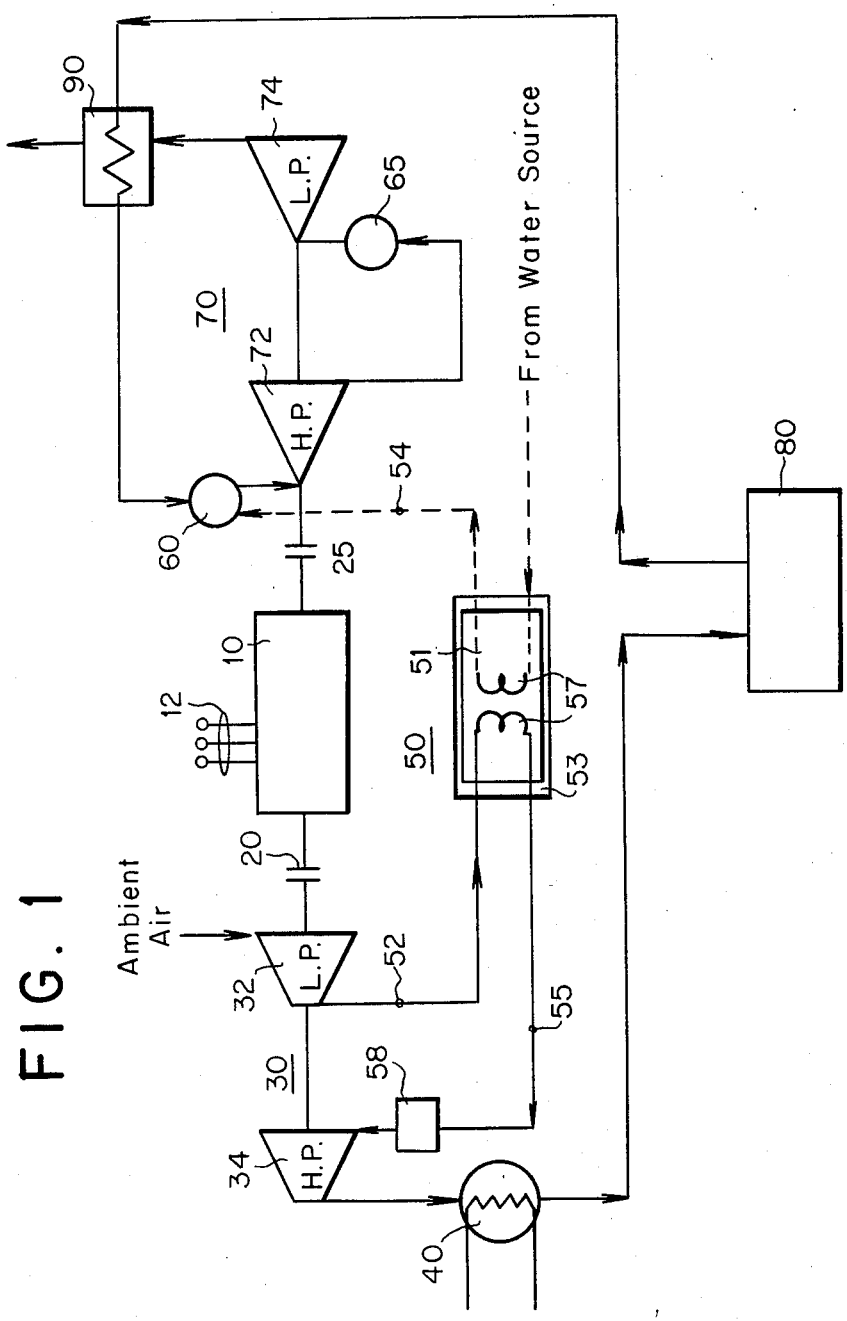
FIG. 1 depicts, in block diagram form, an embodiment in which thermal energy from a compressor train is stored and used to produce steam for an expander train.

Referring to FIG. 1, there is shown a presently preferred embodiment of the invention comprising generator/motor 10, clutches 20, 25, compressor train 30, aftercooler 40, thermal energy storage device 50, air flow piping 52, supply means 54, combustors 60, 65, turbine train 70, air storage device 80 and recuperator 90.

Generator/motor 10 is electrically connected to a baseload power generating plant via power transmission line 12. Generator/motor 10 is disconnectably coupled to compressor train 30 through a clutch 20. The output of compressor train 30 is compressed air that is input to aftercooler 40 which cools the compressed air to a temperature adequate for storage in storage device 80.

In the preferred embodiment of the invention, compressor train 30 comprises a low pressure compressor 32 and a high pressure compressor 34 to efficiently compress air to required operating and storing pressures. Such pressures are highly dependent on the type and depth of air storage device 80. Illustratively, a pressure range of approximately 400 psi to 1000 psi has been found adequate for a salt dome and aquifer located at a depth of approximately 1500 feet. The number of compressors required in compressor train 30 is dependent on air pressure and the type and depth of air storage device 80, as well as other factors.

Furthermore, a compressor compression ratio, which is defined as the ratio of compressor output pressure to input pressure, similarly depends on a variety of factors. Generally, each compressor in a conventional compression train has the same compression ratio. However, in the present invention, a low pressure compressor, which supplies heat to TES, is provided with an increased compression ratio in order to make more heat available for TES. The amount of heat output by a compressor generally depends upon that compressor's compression ratio, with an increased compression ratio corresponding to an increased heat output.

Thermal energy storage device 50 may take on a variety of forms and generally has two main elements, a thermal fill 51 and a containment vessel 53. The thermal fill is a heat storage material of sufficient quantity to store the heat of compression generated during the compression cycle. The thermal fill material is typically cycled at least once a day. The containment vessel supports the thermal fill and, depending on the design, contains the operating pressure.

More specifically, as shown in FIG. 1 the thermal energy storage device may be of the indirect type in which the cycled air transfers heat to and from the thermal fill without direct contact by using a heat exchanger 57. Such a device permits the use of a wide variety of thermal fill materials, such as heavy oil or molten salt. Alternatively, storage device 50 may be of the direct type in which solid material such as pebbles are in direct contact with the compressed air as it is being cycled, such as a pebble bed.

Thermal energy storage device 50 is connected to the compressed air output of low pressure compressor 32 by a heat transfer means such as air flow piping 52. Air flow piping 52 transfers the hot compressed air from the compressor to the thermal energy storage device where it is cooled, the heat being retained in the thermal fill of thermal energy storage device 50 for subsequent use in power generation. Illustrative operating maximum temperatures of the thermal fill are 600° to 800° F. The compressed air exits the thermal energy device via air line 55, is cooled further by intercooler 58 and enters high pressure compressor 34 for additional compression to the desired pressure.

Intercooler 58 is provided to further cool the compressed air entering high pressure compressor 34, thereby reducing the work of compression and avoiding the use of costly high temperature materials for the compressor hardware.

Aftercooler 40 is provided to cool the compressed air exiting the high pressure compressor before entering the air storage device. Although compressed air storage at higher temperatures may improve the thermal efficiency of the system, higher temperatures may introduce undesirable effects in the storage device, such as geological structural problems associated with an underground air storage device.

Generator/motor 10 is also disconnectably coupled to turbine train 70 through a clutch 25. Turbine train 70 comprises a high pressure turbine 72 and a low pressure turbine 74. Combustor 60 is provided with compressed air from air storage device 80 as well as with fuel from a fuel supply (not shown). Thermal energy storage device 50 produces steam by heating water from a water supply and provides such steam via supply line 54 to the compressed air flow before entering combustor 60. The operating temperature of storage device 50 is high enough to produce saturated steam at the specified operating pressure. Combustor 60 provides a high temperature mixture of products of combustion and superheated steam which is expanded in a high pressure turbine. The exhaust gas of high pressure turbine 72 is further directed into combustor 65 where additional fuel is burned and a new high temperature mixture is expanded in low pressure turbine 74. High pressure turbine 72 and low pressure turbine 74 drive generator/motor 10 to provide power to power transmission line 12.

Recuperator 90 is preferably provided to increase the efficiency of the CAES plant cycle. Recuperator 90 utilizes the exhaust gas heat of low pressure turbine 74 to preheat compressed air from air storage device 80 and to introduce such preheated compressed air to combustor 60 thus reducing fuel consumption.

While the teachings of the present invention may be practiced in other fields having a heat supply and benefitting from the addition of steam to a combustion process, the invention will be described in an application relating to CAES systems in which a thermal energy storage device receives heat from a low pressure compressor and supplies saturated steam to a combustor for subsequent expansion in high and low pressure turbines.

More specifically, the present invention operates primarily in two modes: the compression mode and the expansion, or power generation mode. During the compression mode, ambient air is drawn into a low pressure compressor which is powered by a generator/motor functioning as a motor and drawing power from a power grid. The compressor compresses air, thereby decreasing its volume and increasing its pressure and temperature. As a result, the compressed air exiting the low pressure compressor is provided with an elevated temperature, illustratively up to 800° F. This heated compressed air is fed to a thermal energy storage device which stores the heat by transferring it from the heated compressed air to the heat storage medium, which reaches a temperature slightly less than that of the compressed air, illustratively 750° F. The cooled air exiting the thermal energy storage device is further cooled by an intercooler in order to reduce the air temperature to the desired level before entering the high pressure compressor. The high pressure compressor further compresses the air to the desired level, while the aftercooler further cools the compressed air prior to entering the air storage device.

During the expansion (power generation) mode, compressed air from the air storage device is routed to a recuperator to preheat the stored compressed air prior to delivery to the high pressure combustor associated with the high pressure turbine. Additionally, the thermal energy storage device produces saturated steam by heating water from a water source and provides such steam to be mixed with the compressed air flow before entering the high pressure combustor. The high pressure combustor combines the preheated compressed air with the saturated steam, superheats such combination by the use of a fuel and provides the high pressure and temperature mixture to a high pressure turbine which drives the generator/motor functioning as a generator, thus producing electrical power. The high pressure turbine's exhaust gas is input to a low pressure combustor where it is reheated through the use of fuel and expanded in a low pressure turbine. The low pressure turbine also drives the generator/motor, aiding in the production of power. The exhaust gas from the low pressure turbine is utilized as the heating gas in the recuperator. The air/steam exhaust from the low pressure turbine increases the heat transfer coefficients in the recuperator as well as the heat potentially available for recovery.

Since parameters such as temperature, pressure and quantity associated with compressors, turbines, combustors, recuperators, cooling devices and thermal energy storage devices depend largely on the characteristics of the specific system in use, the parameters set forth herein are not absolute, but rather are illustrative and meant to provide the reader with an appreciation of the interaction among and relative proportions of such parameters.

Thus it can be seen that there is provided a CAES system whereby saturated steam that is produced from heat stored during the compression mode is utilized in the expansion mode to increase system efficiency.

In addition, it is to be understood that the invention can be carried out by specifically different equipment and devices and that various modifications, both as to equipment details and operating procedures can be effected without departing from the spirit and scope of the claimed invention. More specifically, the present invention includes, but is not limited to, schemes in which any number of TES devices store heat extracted from any number of compressors and/or cooling devices. Such TES devices may supply steam produced from heated water to any number of combustors as well as to a recuperator.

What is claimed is:

1. A Compressed Air Energy Storage (CAES) plant cycle which utilizes otherwise wasted compression heat by storing such heat in a thermal energy storage (TES) device for subsequent use for steam generation and injection into compressed air flow before entering a high pressure combustor which expands such compressed air to produce additional power, said cycle comprising the steps of:
   compressing a quantity of air in a low pressure compressor during an off-peak load period;
   partially extracting thermal energy from said compressed air thereby producing cooled compressed air;
   storing said extracted thermal energy in said thermal energy storage device;
   further compressing said cooled compressed air in a high pressure compressor;
   cooling said further compressed air output by said high pressure compressor in an aftercooler;
   storing said cooled further compressed air output by said aftercooler in an underground air storage during said off-peak load period;
   producing steam by heating water in said thermal energy storage device during a peak load period;

injecting said steam into said compressed air flow before entering said high pressure combustor;

combusting fuel in said high pressure combustor to produce a high temperature mixture of the products of said combustion and said steam; and expanding said mixture in a turbine.

2. The method of claim 1 wherein said compressed air flow is preheated by a recuperator subsequent to leaving said air storage and prior to entering said high pressure combustor.

3. In a power plant of the type which by use of excess energy generated during off-peak load periods produces compressed air which is accumulated in a storage underground, the stored compressed air being withdrawn from said storage and delivered to a turbine during peak load periods for generation of additional energy, the improvement comprising:

a thermal energy storage device;

heat transfer means for withdrawing heat from a compressor portion of said power plant and transferring said heat to said thermal energy storage device during off-peak load periods; and supply means for supplying $H_2O$ heated by said thermal energy storage device to a combustor associated with a turbine portion of said power plant during peak load periods.

4. The power plant of claim 3 wherein said $H_2O$ is steam.

5. The power plant of claim 4 wherein said combustor combines a fuel, said steam and said compressed air for use in a turbine.

6. The power plant of claim 3 further comprising a heat recuperator to preheat said compressed air for use by said combustor.

7. A method for generating peaking/intermediate electricity from expansion of compressed air comprising the steps:

compressing a quantity of air during an off-peak load period;

extracting thermal energy from said compressed air thereby producing cooled compressed air;

storing said extracted thermal energy in a thermal energy storage device;

storing said cooled compressed air in an air storage device during said off-peak load period;

producing steam by heating water in said thermal energy device during a peak load period;

injecting said steam into compressed air flow from said storage device before entering a combustor;

combusting fuel in said combustor to produce a high temperature mixture of the products of said combustion and said steam; and expanding said mixture in a turbine.

8. The method of claim 7 wherein said compressed air flow is preheated by a recuperator subsequent to leaving said air storage device and prior to entering said combustor.

9. In a Compressed Air Energy Storage (CAES) system having a compression train and an expansion train, the improvement comprising the steps:

extracting thermal energy from said compression train;

storing said extracted thermal energy in a thermal energy storage device;

producing steam for use in said expansion train by introducing water to said thermal energy storage device; and injecting said steam into a combustor of said expansion train.

10. A Compressed Air Energy Storage (CAES) system comprising:

an electrical machine for use as a motor during a compression mode and for use as a generator during an expansion mode;

a compression train which compresses air and stores such compressed air in an air storage device during said compression mode, said compression train being selectively coupled to said motor by way of a first clutch means;

a turbine train which expands said compressed air from said air storage device during said expansion mode, said turbine train being selectively coupled to said generator by way of a second clutch means;

a thermal energy storage device for storing thermal energy;

air flow piping for withdrawing heat from said compression train and transferring said heat to said thermal energy storage device during off-peak load periods; and supply means for supplying $H_2O$ heated by said thermal energy storage device to a combustor associated with said turbine train during peak load periods.

11. The CAES system of claim 10 wherein said compression train comprises:

a low pressure compressor to initially compress ambient air to a first pressure level; and a high pressure compressor having an input connected to a compressed air output of said thermal energy storage device for further compressing air at said first pressure level to an increased second pressure level and subsequently storing such air at said second pressure level in said air storage device.

12. The CAES system of claim 11 wherein said air flow piping is connected to a compressed air output of said low pressure compressor and is also connected to a compressed air input of said thermal energy storage device.

13. The CAES system of claim 11 wherein said low pressure compressor has a higher compression ratio than said high pressure compressor.

14. The CAES system of claim 10 wherein said $H_2O$ is heated to generate steam.

15. The CAES system of claim 14 wherein said combuster burns a fuel in a mixture of said steam and said compressed air for use in a turbine.

16. The CAES system of claim 10 further comprising a heat recuperator to preheat said compressed air for use by said combustor.

17. The CAES system of claim 10 wherein said turbine train comprises:

a high pressure turbine to initially expand compressed air from said air storage device; and a low pressure turbine to further expand compressed air output by said high pressure turbine.

* * * * *